United States Patent
Chiu

(10) Patent No.: US 7,801,385 B2
(45) Date of Patent: Sep. 21, 2010

(54) PERCEPTUAL FILTER SUPPORT TECHNIQUES

(75) Inventor: Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 581 days.

(21) Appl. No.: 11/126,578

(22) Filed: May 10, 2005

(65) Prior Publication Data
US 2006/0257044 A1   Nov. 16, 2006

(51) Int. Cl.
*G06K 9/40* (2006.01)

(52) U.S. Cl. .................. 382/254; 382/239; 358/474; 375/240

(58) Field of Classification Search .................. 382/254
See application file for complete search history.

(56) References Cited

U.S. PATENT DOCUMENTS

| | | | | |
|---|---|---|---|---|
| 5,294,989 A | * | 3/1994 | Moore et al. | 348/241 |
| 6,031,638 A | * | 2/2000 | Rao et al. | 358/474 |
| 6,348,798 B1 | * | 2/2002 | Daw | 324/426 |
| 6,366,705 B1 | * | 4/2002 | Chiu et al. | 382/239 |
| 6,678,424 B1 | * | 1/2004 | Ferguson | 382/286 |
| 2002/0186894 A1 | * | 12/2002 | Ferguson | 382/261 |
| 2003/0053698 A1 | * | 3/2003 | Ferguson | 382/210 |
| 2008/0101471 A1 | * | 5/2008 | Yin et al. | 375/240.16 |

* cited by examiner

*Primary Examiner*—Vu Le
*Assistant Examiner*—Tsung-Yin Tsai
(74) *Attorney, Agent, or Firm*—Kacvinsky Daisak PLLC

(57) ABSTRACT

A system, apparatus, method and article to filter media signals are described. The apparatus may include a media processor. The media processor may include an image signal processor having multiple processing elements to process a pixel matrix to determine a set of filter support pixels for a target pixel, select reference pixels from the filter support pixels using a complexity value, and filter noise from the target pixel using the reference pixels. Other embodiments are described and claimed.

20 Claims, 7 Drawing Sheets

PERCEPTUAL FILTER SUPPORT TECHNIQUES

BACKGROUND

Media processing applications, such as image or video processing, may have a need for one or more filters. For example, an image may undergo several media processing operations that may introduce noise into the image. A filter may be used in an attempt to reduce such noise. Some filtering techniques, however, may generate undesirable results such as blurring or artifacts. Improvements in filtering techniques may reduce these and other undesirable results associated with filtering operations.

DETAILED DESCRIPTION

The embodiments may be directed to noise reduction filter techniques suitable for use with video processors, image processors, display processors, media processors, and the like. The embodiments use various properties of the human vision system (HVS) and the complexity of local picture content (CLPC) to select a set of reference pixels in a filter support to improve the quality of a video, image or picture. The embodiments are not limited in this context.

Figure 1:
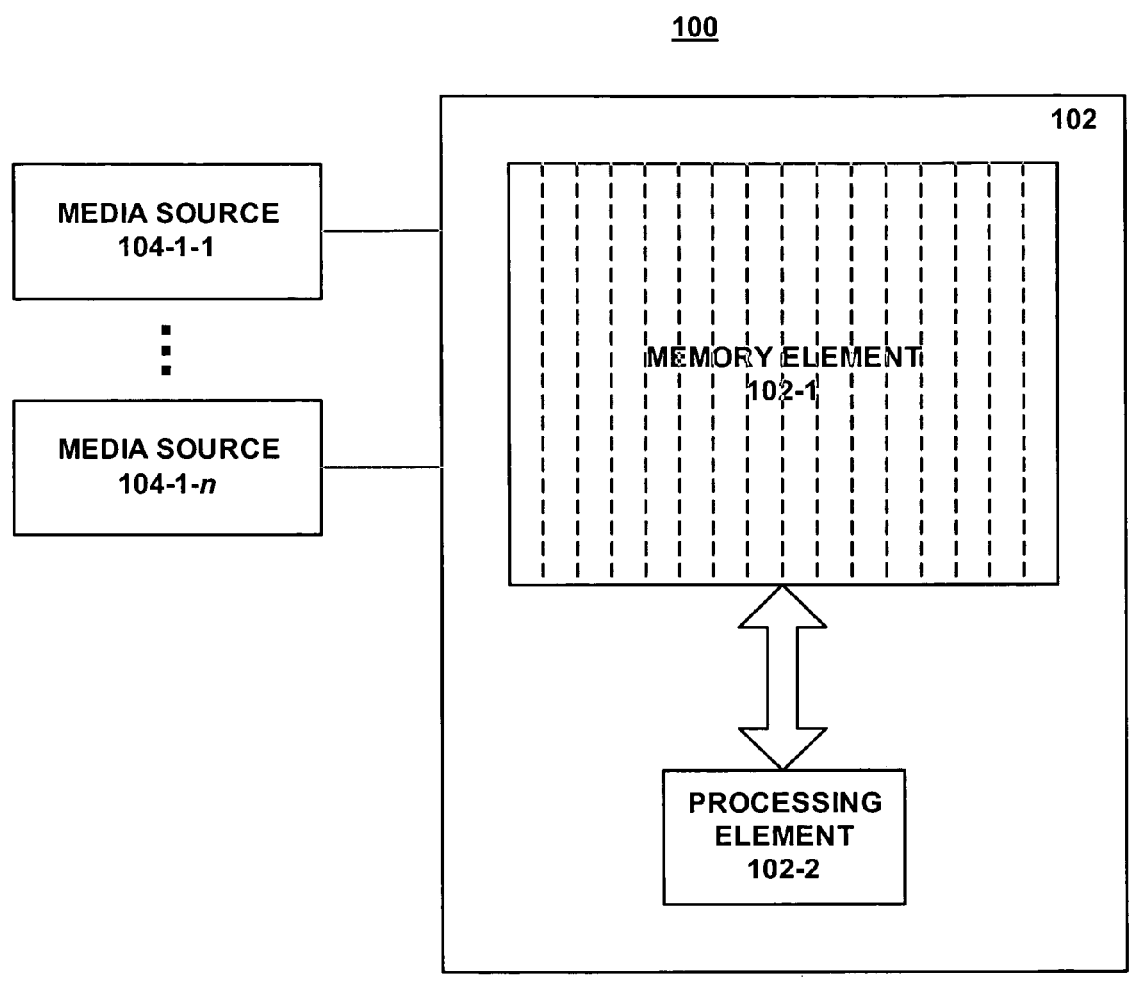
FIG. 1 illustrates one embodiment of a system.

FIG. 1 illustrates a block diagram of a system 100. In one embodiment, for example, the system 100 may comprise a communication system having multiple nodes. A node may comprise any physical or logical entity for communicating information in the system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation. The embodiments are not limited in this context.

In various embodiments, a node may comprise a media processing system, a set top box (STB), a television, a consumer appliance, a processing system, a computer system, a computer sub-system, a computer, a workstation, a terminal, a server, a personal computer (PC), a laptop, an ultra-laptop, a handheld computer, a personal digital assistant (PDA), a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a media processor, and so forth. The embodiments are not limited in this context.

In various embodiments, the nodes of system 100 may communicate, manage, or process information in accordance with one or more protocols. A protocol may comprise a set of predefined rules or instructions for managing communication among nodes. A protocol may be defined by one or more standards as promulgated by a standards organization, such as the Internet Engineering Task Force (IETF), International Telecommunications Union (ITU), the International Organization for Standardization (ISO), the International Electrotechnical Commission (IEC), the Institute of Electrical and Electronics Engineers (IEEE), and so forth. The embodiments are not limited in this context.

As shown in FIG. 1, the system 100 may comprise a media processing node 102. In various embodiments, the media processing node 102 may be arranged to process one or more types of information, such as media information. Media information generally may refer to any data representing content meant for a user, such as image information, video information, graphical information, audio information, voice information, textual information, numerical information, alphanumeric symbols, character symbols, and so forth. The embodiments are not limited in this context.

In various embodiments, media information may comprise image information. Image information may generally refer to any data derived from or associated with one or more static or video images. In one embodiment, for example, image information may comprise one or more pixels derived from or associated with an image, region, object, picture, video, reel, frame, clip, feed, stream, and so forth. The values assigned to pixels may comprise real numbers and/or integer numbers. The embodiments are not limited in this context.

In various embodiments, media processing node 102 may be arranged to process media information received from media source nodes 104-1-n, with n representing any positive integer. The media processing node 102 may be connected to one or more media source nodes 104-1-n through one or more wired and/or wireless communications media, as desired for a given implementation.

Media source nodes 104-1-n may comprise any media source capable of delivering media information (e.g., image information, video information, audio information, or audio/video information) to a destination node and/or to an intermediary node, such as media processing node 102. An example of a media source may include a source for video signals, such as from a computer to a display. Other examples of a media source may include a digital camera, A/V camcorder, video surveillance system, teleconferencing system, telephone system, medical and measuring instruments, scanner system, copier system, and other sources needing image and audio processing operations. Another example of a media source may include a source for audio signals. The audio source may be arranged to source or deliver standard audio information, such as analog or digital music. The embodiments are not limited in this context.

Another example of a media source may include a source for audio/video (A/V) signals such as television signals. The media source may be arranged to source or deliver standard analog television signals, digital television signals, high definition television (HDTV) signals, and so forth. The television signals may include various types of information, such as television audio information, television video information, and television control information. The television video information may include content from a video program, computer generated images (CGI), and so forth. The television audio information may include voices, music, sound effects, and so forth. The television control information may be embedded control signals to display the television video and/or audio information, commercial breaks, refresh rates, synchronization signals, and so forth. The embodiments are not limited in this context.

In some embodiments, media source nodes 104-1-n may originate from a number of different devices or networks. For example, media source nodes 104-1-n may include a device arranged to deliver pre-recorded media stored in various formats, such as a Digital Video Disc (DVD) device, a Video Home System (VHS) device, a digital VHS device, a computer, a gaming console, a Compact Disc (CD) player, a scanner, a facsimile machine, a copier machine, and so forth. In yet another example, media source nodes 104-1-n may include media distribution systems to provide broadcast or streaming analog or digital television or audio signals to media processing node 102. Examples of media distribution systems may include, for example, Over The Air (OTA) broadcast systems, terrestrial cable systems (CATV), satellite broadcast systems, and so forth. The types and locations of media source nodes 104-1-n are not limited in this context.

In some embodiments, media source nodes 104-1-n may originate from a server connected to the media processing node 102 through a network. A server may comprise a computer or workstation, such as a web server arranged to deliver Hypertext Markup Language (HTML) or Extensible Markup Language (XML) documents via the Hypertext Transport Protocol (HTTP), for example. A network may comprise any type of data network, such as a network operating in accordance with one or more Internet protocols, such as the Transport Control Protocol (TCP) and Internet Protocol (IP). The embodiments are not limited in this context.

In various embodiments, the media processing node 102 may comprise, or be implemented as, one or more of a media processing system, a media processing sub-system, a media processor, a media computer, a media device, a media encoder, a media decoder, a media coder/decoder (codec), a media compression device, a media decompression device, a media filtering device, a media transformation device a media entertainment system, a media display, STB, or any other media processing architecture. The embodiments are not limited in this context.

In various embodiments, for example, the media processing node 102 may perform media processing operations such as encoding and/or compressing of media data into a file that may be stored or streamed, decoding and/or decompressing of media data from a stored file or media stream, media filtering, media playback, internet-based media applications, teleconferencing applications, and streaming media applications. Examples of media filtering may include noise filtering, noise reduction filtering, pixel averaging, median filtering, rank filtering, graphic scaling, deblocking filtering, and so forth. The embodiments are not limited in this context.

In various embodiments, the media processing node 102 may comprise multiple elements, such as elements 102-1-p, where p represents any positive integer. Although FIG. 1 shows a limited number of elements by way of example, it can be appreciated that more or less elements may be used for a given implementation. The embodiments are not limited in this context.

Elements 102-1-p may comprise, or be implemented as, one or more systems, sub-systems, processors, devices, machines, components, circuits, registers, modules, applications, programs, subroutines, or any combination thereof, as desired for a given set of design or performance constraints. In various embodiments, elements 102-1-p may be connected by one or more communications media. Communications media generally may comprise any medium capable of carrying information signals. For example, communication media may comprise wired communication media, wireless communication media, or a combination of both, as desired for a given implementation. The terms "connection" or "interconnection," and variations thereof, in this context may refer to physical connections and/or logical connections. The embodiments are not limited in this context.

In various embodiments, the media processing node 102 may comprise a memory element 102-1. The memory element 102-1 may comprise, or be implemented as, any machine-readable or computer-readable media capable of storing data, including both volatile and non-volatile memory. For example, memory 102-1 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 102-1 may be included on the same integrated circuit as processor 102-1, or alternatively some portion or all of memory 102-1 may be disposed on an integrated circuit or other medium, for example a hard disk drive, that is external to the integrated circuit of processor 102-1. The embodiments are not limited in this context.

In various embodiments, the memory element 102-1 may be arranged to store media information, for example. In various implementations, the memory element 102-1 may be arranged to store one or more items of media information, such as one or more pixels of image information. In one embodiment, for example, one or more pixels of image information may be stored as words in memory element 102-1. A pixel generally may comprise multiple bits of information (e.g., 8 bits), and a word may have storage capacity for a certain amount of information (e.g., 32 bits or 4 pixels). Accordingly, in various embodiments, the memory element 102-1 may comprise multiple items of media information in a single word. In some implementations, multiple items of media information (e.g., pixels of image information) may correspond to a horizontal or vertical line of an image. The embodiments are not limited in this context.

In various embodiments, the memory element 102-1 may arrange media information as a two-dimensional (2D) matrix or array having N rows and M columns. Each row and column of a matrix may be arranged to store multiple words, items, and elements. In one example, a matrix may comprise 32 bit rows and 32 bit columns. Accordingly, in this example, media information may be arranged as a 4×4 matrix of 8 bit items. In another example, a matrix may comprise 64 bit rows and 64 bit columns. Accordingly, in this example, media information may be arranged as an 8×8 matrix of 8 bit items and/or as four 4×4 sub-matrices of 8 bit items. Although described above for two dimensions, the concepts and techniques may be applied to three or more dimensions. The embodiments are not limited in this context.

In various embodiments, media information may be arranged as one or more matrices of items (e.g., pixels of image information). For example, media information may be arranged as one or more matrices. Each matrix may, in turn, comprise multiple sub-matrices. For instance, an 8×8 matrix may comprise four 4×4 sub-matrices, and a 32×32 matrix may comprise sixteen 4×4 sub-matrices. It is to be understood that the term "matrix" along with its derivatives may comprise, or be implemented, as any matrix or sub-matrix of any size. The embodiments are not limited in this context.

In various embodiments, media processing node 102 may comprise a processing element 102-2. The processing element 102-2 may comprise, or be implemented as one or more processors capable of providing the speed and functionality desired for an embodiment and may include accompanying architecture. For example, the processing element 102-2 may be implemented as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing element 102-2 may be implemented as a general purpose processor, such as a processor made by Intel® Corporation, Santa Clara, Calif. The processing element 102-2 may also be implemented as a dedicated processor, such as a controller, microcontroller, embedded processor, a digital signal processor (DSP), a network processor, a media processor, an input/output (I/O) processor, and so forth. The embodiments are not limited in this context.

In various embodiments, the processing element 102-2 may comprise, or be implemented as, one or more of a media processing system, a media processing sub-system, a media processor, a media computer, a media device, a media encoder, a media decoder, a media codec, a media compression device, a media decompression device, a media filtering device (e.g., graphic scaling device, deblocking filter, separable 2D filter), a media transform device (e.g., discrete cosine transform device, inverse discrete cosine transform device, fast Fourier transform device, inverse fast Fourier transform device), a media entertainment system, a media display, or any other media processing architecture. The embodiments are not limited in this context.

In various embodiments, the processing element 102-2 may be arranged to process media information, for example. In various implementations, the processing element 102-2 may be arranged to process one or more items of media information, such as one or more pixels of image information. In one embodiment, for example, media processing node 102 may perform processing operations on a matrix of media information, such as pixels of image information. The processing operations may be performed in a horizontal direction and in a vertical direction of the matrix.

In various implementations, processing operations performed by the media processing node 102 may include filtering information, such as media information. For example, various embodiments may be directed to filtering techniques to reduce noise in an image. Such media information may be subject to noise from a number of different sources. Noise may be introduced during media capture operations, media processing operations such as media encoding and/or compression, media transmission operations, media storage operations, and so forth. For example, media information may be compressed in accordance with a number of different video compression standards, such as the ITU H.261/H.263/H.264 series of standards, the ISO Motion Picture Experts Group (MPEG) 1/MPEG-2/MPEG-4 series of standards, and so forth. Media compression attempts to reduce the number of information bits needed to represent image content with a corresponding loss in image quality. The major phases of media compression may include motion estimation, motion compensation, transform, quantization and entropy encoding. The phase of quantization is a lossy process of reducing the data bit rate to meet the bandwidth requirements of an application at the cost of quality. The information loss during quantization operations is typically unrecoverable and introduces coding artifacts. This and other information loss during compression operations may sometimes be referred to as "coding noise."

Some embodiments attempt to reduce noise (e.g., coding noise) in an image using a number of filtering techniques. In one embodiment, for example, the media processing node 102 may be arranged to perform horizontal and/or vertical filtering for a P×Q pixel matrix of a frame, where P×Q represents any positive integer (e.g., 3×3, 4×4, and so forth). In one embodiment, the media processing node 102 may filter an image using the average from a set of reference pixels in a filter support which is usually in the spatial and/or temporal neighborhood of a target pixel. An example of such pixel averaging filtering techniques may include median or rank filtering (collectively referred to herein as "median filtering") on pixels of image information. The embodiments, however, are not limited in this context.

In one embodiment, media processing node 102 may filter pixel matrices using one or more median filtering techniques. A median filter is an image-processing technique to reduce impulse signal noise found in many electronic devices, such as a charged-coupled device (CCD), by replacing each pixel with the median of its neighbors (inclusive). For example, a median filter may replace each pixel z by its rank relative to the pixels in some neighborhood of z. Thus if z is the brightest pixel in its neighborhood, it is mapped to white. If z is the darkest pixel, it is mapped to black. Further, if z is the median pixel, it is mapped to 50% (gray). Although some embodiments may be described as using median filtering by way of example, it may be appreciated that any pixel averaging technique may be used and still fall within the intended scope of the embodiments. The embodiments are not limited in this context.

Conventional median filter techniques, however, may only be as effective as the reference pixels selected to perform the filtering. For example, pixel averaging filtering techniques such as median filtering may cause undesirable blurring artifacts depending on the set of reference pixels selected for the filter.

Some embodiments solve these and other problems using one or more improved noise filtering techniques. The noise filtering techniques may use characteristics of the human vision system (HVS) to select a set of reference pixels in the filter support to improve quality of an image. Some embodiments may improve noise filtering by innovatively selecting the reference pixels in the filter support. For example, some embodiments may use a refinement criterion to select reference pixels in the filter support, where the refinement is based on a correlation between the discrimination capability of the HVS and the complexity of local picture content (CLPC). The CLPC may comprise, for example, a given set of local pixels in some proximity to a target pixel to be filtered.

In one embodiment, for example, a media processor may be used to implement noise filtering operations. The media processor may include one or more image signal processors each comprising multiple processing elements. One or more image signal processors may be arranged to process a pixel matrix to determine a set of filter support pixels for a target pixel. The image signal processor may select reference pixels from the filter support pixels using a complexity value. The complexity value may represent, for example, the CLPC of some or all of an image. The image signal processor may filter noise from the target pixel using the selected reference pixels.

A media processor suitable for use with media processing node 102 may be described in more detail with reference to FIG. 2.

Figure 2:
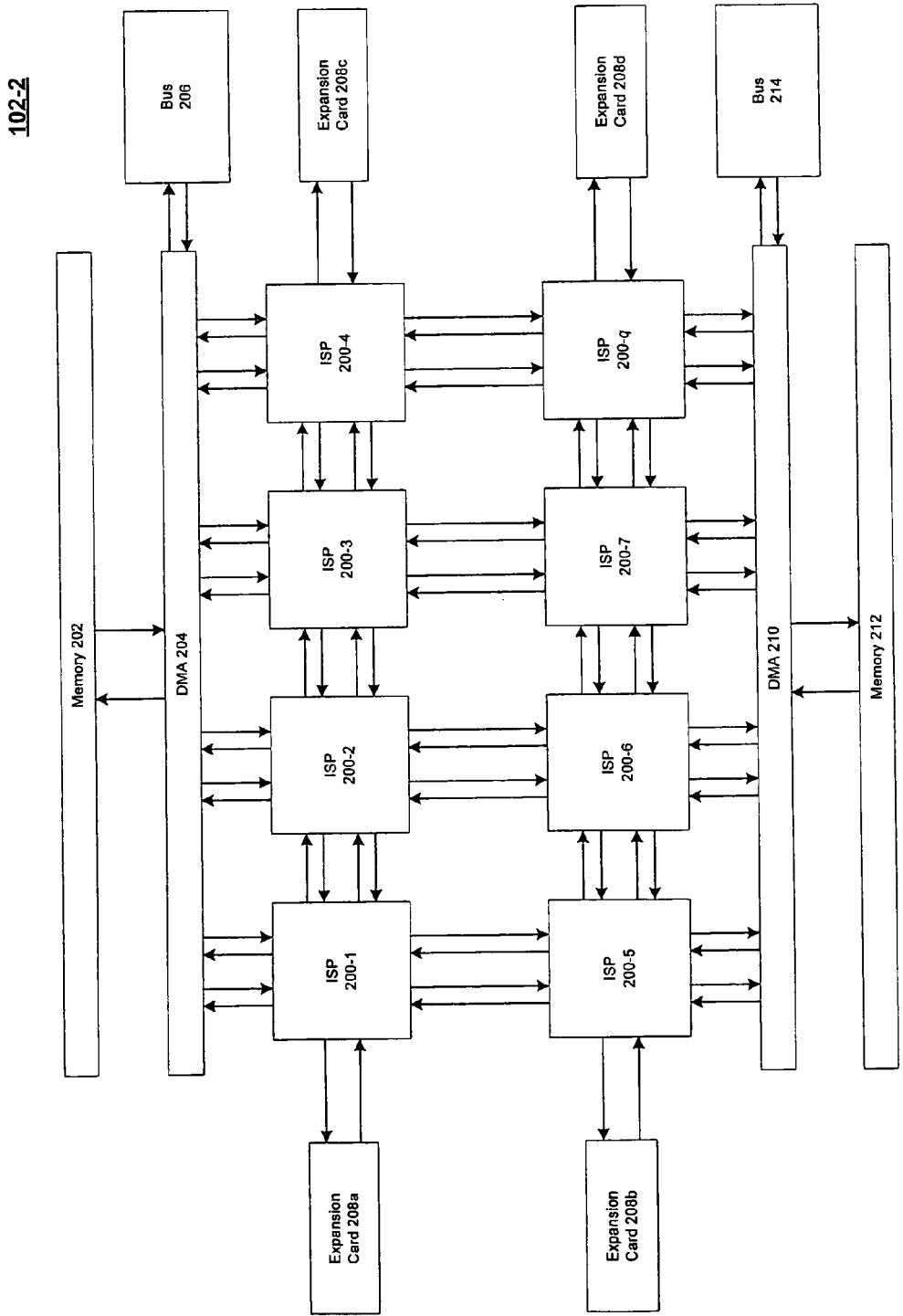
FIG. 2 illustrates one embodiment of a media processor.

FIG. 2 illustrates one embodiment of a media processor. The media processor 102-2 may perform various media processing operations for media processing node 102. Although FIG. 2 shows a limited number of elements for the media processor 102-2 by way of example, it can be appreciated that more or less elements may be used in media processor 102-2 as desired for a given implementation. The embodiments are not limited in this context.

In one embodiment, media processor 102-2 may be implemented as a multiple instruction streams, multiple data streams (MIMD) processor arranged to operate in accordance with a single instruction stream, multiple data streams (SIMD) instruction set. Examples for the media processor 102-2 may include a media processor from a series of media processors made by Intel Corporation, such as an MXP5800 Digital Media Processor, an MXP5400 Digital Media Processor, and so forth. In one embodiment, for example, the media processor 102-2 may be implemented using an MXP5800. The embodiments, however, are not limited in this context.

The media processor 102-2 may include multiple image signal processors (ISP) 200-1-q. In one embodiment, for example, the media processor 102-2 may include eight ISP 200-1-8 coupled to each other via programmable ports (e.g., quad ports). The quad ports may form a mesh-connected grid to flexibly route data among the ISP 200-1 -q. Each ISP 200-1-q may have five 16-bit arithmetic logic units (ALU) with dual MAC units, totaling 40 ALU units and 16 MAC units for the entire media processor 102-2. Although media processor 102-2 is shown in FIG. 2 with eight ISP 200-1-8, it may be appreciated that any number of ISP may be used as desired for a given implementation. The embodiments are not limited in this context.

In addition, the quad ports may couple the ISP 200-1-q to other elements. For example, the quad ports may couple ISP 200-1-q to various memory units, such as memory units 202, 212. Memory units 202, 212 may comprise, for example, dual data rate (DDR) SDRAM memory units including DDR 266× 16 interfaces. The quad ports may also couple the ISP 200-1-q to direct memory access (DMA) units 204, 210. Each DMA unit 204, 210 may include an 18 channel DMA interface, thereby providing 36 channels to support memory units 202, 212. DMA units 204, 210 may be connected to buses 206, 214. Buses 206, 214 may comprise, for example, peripheral component interconnect (PCI) buses. In one embodiment, for example, the PCI buses 206, 214 may comprise 32-bit buses operating at 66 MHz. The embodiments are not limited in this context.

In general operation, the media processor 102-2 may receive an input stream of pixel values and perform various image processing operations on the pixel stream using one or more of the ISP 200-1-q. For example, the media processor 102-2 may perform noise reduction filtering using one or more of the ISP 200-1-q. An example of an ISP 200-1-q suitable for use with the media processor 102-2 may be described in more detail with reference to FIG. 3.

Figure 3:
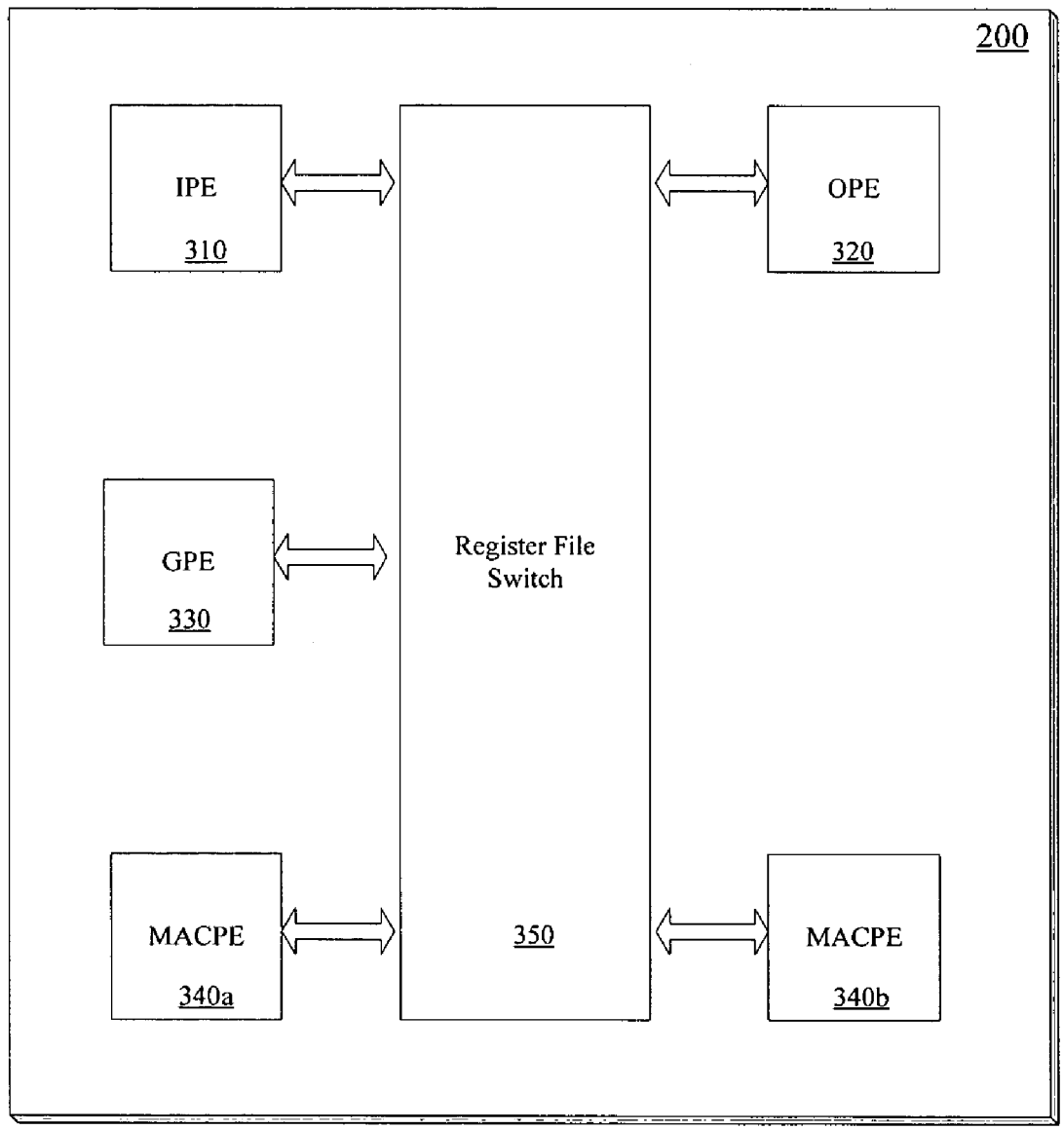
FIG. 3 illustrates one embodiment of an image signal processor.

FIG. 3 illustrates one embodiment of an ISP. FIG. 3 may illustrate an ISP 200 from ISP 200-1-q. The ISP 200 may include multiple processing elements (PE) coupled to a register file switch 350. In particular the multiple PE may include an input PE (IPE) 310, an output PE (OPE) 320, a general purpose PE (GPE) 330, and two multiply-accumulate PE (MACPE) 340a and 340b. Register file switch 350 provides a fast and efficient interconnect mechanism between the various PE.

In one embodiment, individual threads are mapped to the PE in such a way as to minimize the communication overhead. In a further embodiment, the programming model of ISP 200 is such that each PE implements a part of an algorithm and data flows from one PE to another and from one ISP to another in a pipeline manner until the data is completely processed.

According to one embodiment, each PE uses a data driven technique to process data. In a data driven technique, each piece of data in the system has a set of Data Valid (DV) bits that indicate for which PE the data is intended. Thus, if a register data is intended for two PE (e.g., GPE 330 and MACPE 340), the DV bits 0 and 1 of the register is set. If GPE 330 no longer needs the data, then it resets the DV bit. When the DV bits for all of the consumer PE in a register are reset, the producer PE can go ahead and write new data into the register with a new set of DV bit settings. Otherwise, the producer PE is stalled until the various consumer PE have reset their respective DV bits. Similarly, if a PE attempts to read a piece of data from a register and if its DV bit is not set, the PE stalls until there is a data with DV bit corresponding to the consumer PE set. This technique allows the various PE to share and use the registers, while potentially reducing the complexity of the user-programming model.

In one embodiment, the IPE 310 is coupled to quad ports to receive input data streams and to route the data to other PE within the ISP 200. The OPE 320 is coupled to the quad ports to transmit outgoing data streams (e.g., to an adjacent ISP 200-1-q) once the data has been processed at the ISP 200. The GPE 330 is a basic PE upon which the other PE may be constructed. The MACPE 340a-b performs mathematical operations, such as multiply and accumulate operations, for a particular ISP 200. Although not shown in FIG. 3, each PE may also include a multitude of local registers (LR) and indirect registers (IR). The embodiments are not limited in this context.

According to one embodiment, the various PE within ISP 200 may be arranged to perform noise reduction filtering operations, such as median filtering operations, for example. Median filters are a class of non-linear filter commonly used in image and video processing. The median filter operates on a set of pixel values. The median filter may use a rank algorithm to rank the pixel values. For example, a median filter of order n arranges input pixel values in ascending order of magnitude and outputs $n^{th}$ element. For example, a non-linear 3×3 kernel-size median filter receives a 2-D pixel matrix of 3 rows of 3 elements each. The input pixel values are arranged in ascending order of magnitude and rank 5 outputs the $5^{th}$ element of this sorted pixel matrix.

More particularly, the various PE within ISP 200 may be arranged to perform noise reduction filtering operations enhanced in accordance with one or more characteristics of the HVS. For example, some embodiments may use characteristics of the HVS to select a set of reference pixels in the filter support to improve quality of an image. The selection of the filter support typically requires a tradeoff between system requirements such as picture quality and computational complexity. A large filter support size provides better smoothing picture quality with the cost of additional hardware circuits and memory. On the other hand, a small filter support size reduces the amount of calculations at the cost of picture quality. The size of a filter support for a particular implementation may vary in accordance with the resources available within a given system budget. The embodiments are not limited in this context.

The reference pixels in the filter support usually lie within the spatial and temporal neighborhood of the target pixel due to high pixel correlation property of close proximity. Some advanced systems may employ motion compensating techniques to acquire better temporally matched reference pixels via motion estimation techniques. The reference pixels in the filter support may be selected from various areas around a target pixel, including a spatial neighborhood, a temporal neighborhood, or the temporal neighborhood displaced by the motion vector. The embodiments are not limited in this context.

Some embodiments may improve noise filtering by innovatively selecting the reference pixels in the filter support. For example, some embodiments may use a refinement criterion to select reference pixels in the filter support, where the refinement is based on a correlation between the discrimination capability of the HVS and the CLPC. Some embodiments may model the correlation of the discrimination capability of the HVS and the CLPC, and apply the model when selecting a threshold value for the reference pixels in the filter support. The model may comprise, for example, a non-linear mapping between the selected threshold value and the CLPC. In some embodiments, the selection criterion for the set of reference pixels in the filter support for a noise reduction filter may be based on a pre-modeled threshold derived from the HVS model. The CLPC may be modeled using a series of arithmetic pixel operations. Alternatively, the CLPC may be modeled based on a set of reference pixels derived from independent or joint combinations of spatial, temporal, and motion compensated neighborhoods.

Operations for the system 100, the media processor 102-2, and/or the ISP 200 may be further described with reference to the following figures and accompanying examples. Some of the figures may include logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
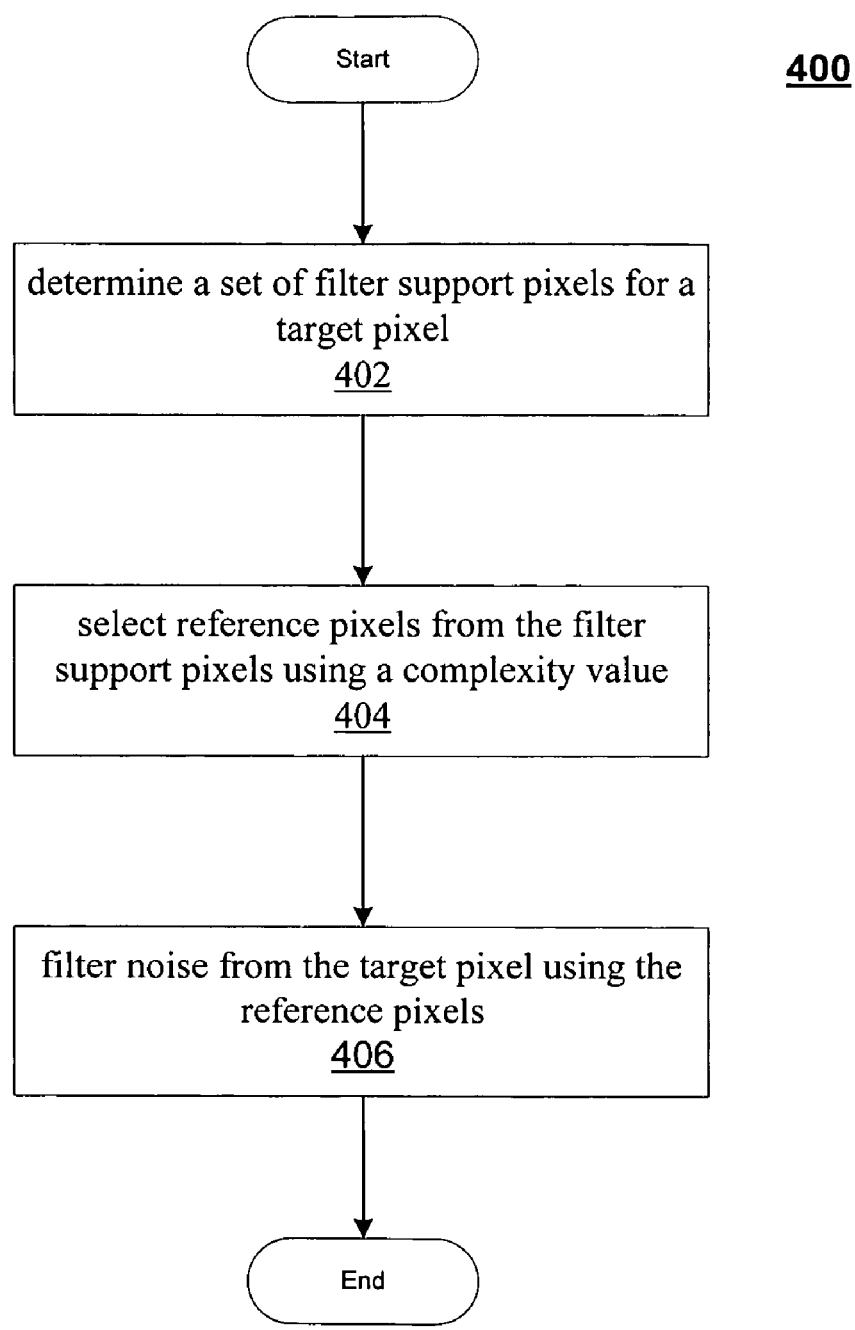
FIG. 4 illustrates one embodiment of a logic flow.

FIG. 4 illustrates one embodiment of a logic diagram. FIG. 4 illustrates a logic flow 400. The logic flow 400 may be representative of the operations executed by one or more structure described herein, such as an ISP 200 of the media processor 102-2. More particularly, the logic flow 400 may be representative of the operations executed by the ISP 200 to perform noise reduction filtering. As shown in FIG. 4, a set of filter support pixels may be determined for a target pixel at block 402. Reference pixels may be selected from the filter support pixels using a complexity value at block 404. Noise may be filtered from the target pixel using the reference pixels at block 406.

In one embodiment, the reference pixels may be selected from the filter support pixels using a complexity value at block 404. For example, a complexity value may be determined for a set of local pixels. In one embodiment, for example, the set of local pixels may match the filter support pixels, although the embodiments are not limited in this context. A threshold value may be determined based on the complexity value. For example, the threshold value may be fixed threshold value, or the threshold value may be a variable threshold value retrieved from a table using the complexity value. A difference value may be determined between a target pixel value for the target pixel and a candidate reference pixel value for a candidate reference pixel. The difference value may be compared with the threshold value. The candidate reference pixel may be selected for the set of reference pixels in accordance with the comparison. For example, the candidate reference pixel may be selected for the set of reference pixels if the difference value is less than the threshold value.

The operation of the above described embodiments may be better understood by way of example. Assume that media processor 102-2 receives a stream of media information comprising pixel values for a series of video images. Media processor 102 may filter the stream of media information using one of a number of noise reduction filters. In one embodiment, for example, media processor 102-2 may filter the stream of media information by determining a set of filter support pixels for a target pixel. Media processor 102 may select a set of reference pixels from the filter support pixels. The selection of the reference pixels in the filter support may be critical for filtering operations since an outliner candidate may exist in the filter support area. For example, the target pixel may comprise a pixel on the edge of an image. In this case, some portion of the reference pixels in the neighborhood may reside on the other side of the edge where there is no media information. Using the reference pixels from the other side of edge in filtering operations may blur the edge boundary and result in a reduced sharpness of the image. Therefore, improving the algorithm used to select reference pixels may result in improved image quality.

The problem of reference pixel selection, however, is relatively complicated. Ideally, the selected reference pixels should affect the picture as little as possible, while reducing the noise as much as possible. In terms of visual perception, the picture quality of a video or image is based on the perception of the HVS. Consequently, some embodiments comprise noise reduction techniques that incorporate one or more characteristics of the HVS. Accordingly, some embodiments may attempt to select a set of reference pixels in the filter support area in view of these HVS characteristics.

In one embodiment, for example, media processor 102-2 may determine a set of filter support pixels for a target pixel. For example, consider the target pixel x of picture number k. The associated filter support may be denoted as shown in Equation (1) as follows:

$$S(x, k) = \{x + n(x) + mv(x), k+l\} \quad (1)$$

where n(x) is the neighborhood of the target pixel x, mv(x) is the displacement based on the motion vector, and l is the time displacement. Depending on the system constraints, n(x) may comprise a P×Q pixel matrix comprising neighboring pixels centered at the target pixel x, where P×Q represents any positive integer (e.g., 3×3, 4×4, 5×5, 7×7, and so forth). The displacement information represented by mv(x) may be acquired from the matching of motion estimation between the target pixel x in the current image to the reference pixel in the reference image. Filter support coming from the previous picture may be indicated when l is a negative integer, coming from the next picture when l is a positive integer, or coming from the current picture when l is equal to 0.

Once the filter support is determined, the media processor 102-2 may use a refinement technique to select the reference pixels in the filter support for picture noise reduction. For example, assume the media processor 102-2 selects a set of reference pixels R(x, k) from the filter support S(x, k) as denoted by Equation (2) as follows:

$$R(x) = \{R\_i \in S(x, k) \text{ AND } |R\_i - x| < Th(x)\} \quad (2)$$

where Th(x) represents the threshold value for the target pixel x as explained in more detail below. Since R_i belongs to S(x, k) and k could be a positive, a negative or a zero integer, R_i may reside in the neighborhood of target pixel x from the current, previous and next images. If a motion compensated technique is applied, R_i may reside in the neighborhood of target pixel x displaced by the motion vector in the reference image.

The exact modeling of the function Th(x) may be performed using principles derived from the joint fields of mathematics and experimental psychology. For example, the discrimination capability of the HVS seems to decrease as the picture content becomes more complicated. On the other hand, the HVS becomes relatively sensitive to even mild changes in a homogeneous background. Studies in the field of experimental psychology have found that there is a just-noticeable-distortion (JND) threshold below which the HVS may have difficulty distinguishing slight changes in the image content. There is also a minimal-noticeable-distortion (MND) threshold where the HVS begins to sense artifacts caused by distortion. On average, individuals may notice that the HSV tends to lose discrimination capability regarding fine content details if the scene is relatively complicated. This concept may be described in further detail with reference to FIGS. 5-7.

Figure 5:
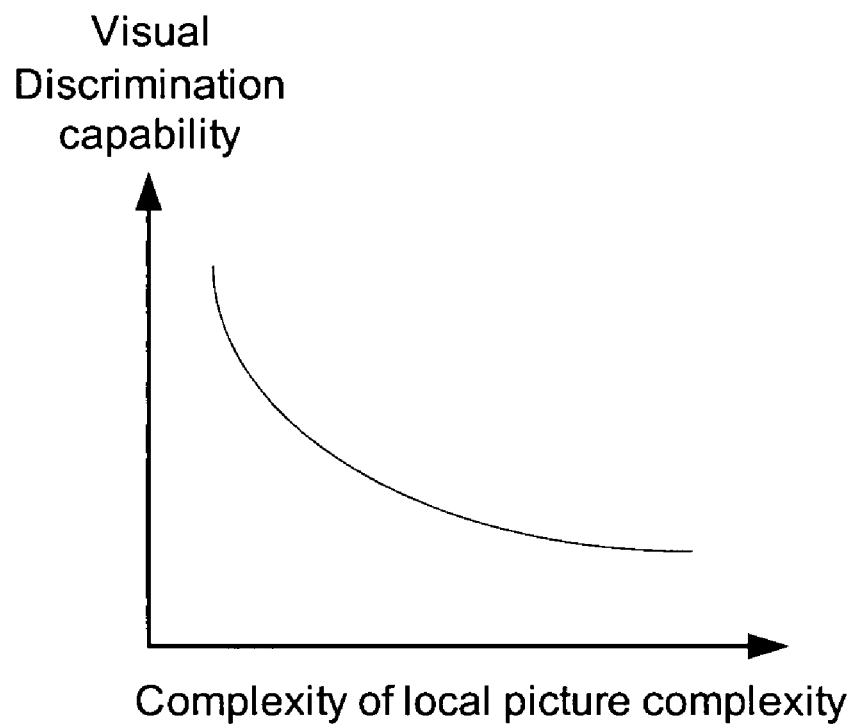
FIG. 5 illustrates one embodiment of a first graph.

FIG. 5 illustrates one embodiment of a first graph. FIG. 5 illustrates a graph 500. Graph 500 may illustrate the correlation between the discrimination capability of the HVS and the CLPC of a set of local pixels in a reference image. In some embodiments, the set of local pixels may match the filter support pixels, although the embodiments are not limited in this context. The x-axis may represent the CLPC and the y-axis may represent the discrimination capability of the HVS. As indicated by graph 500, the discrimination capability of the HVS tends to decrease as the CLPC increases, and vice-versa. This property or characteristic of the HVS may be used to improve the algorithm used for selecting reference pixels from the filter support pixels for a given target pixel x.

Figure 6:
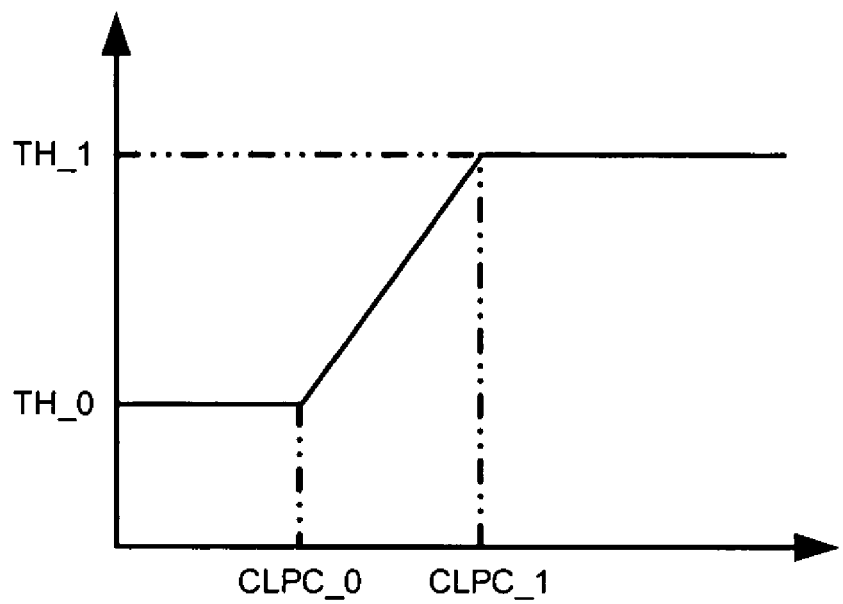
FIG. 6 illustrates one embodiment of a second graph.

FIG. 6 illustrates one embodiment of a second graph. FIG. 6 illustrates a graph 600. Graph 600 may illustrate a non-linear mapping between the threshold function Th(x) and the CLPC. In some embodiments, Th(x) may be derived based on the CLPC surrounding the target pixel x. Graph 600 may illustrate a non-linear mapping between the Th(x) and the CLPC. The x-axis represents the strength of the CLPC and the y-axis is the associated threshold value. The range of CLPC (x)<CLPC_0 may represent the pixels locating in the area of the homogeneous picture content where the threshold value, TH_0, is a smaller value below which the HVS has difficulty distinguishing the mild change in image content. The range of CLPC(x)>CLPC_1 may represent the pixels residing in the area of very complicated image content where the threshold value, TH_1, is a larger value above which the HSV cannot discriminate much difference among the highly complicated scene. For clarity, we use a direct line to map the correlation for the range between CLPC_0 and CLPC_1. As shown by graph 600, the threshold value derived from threshold function Th(x) may vary as the complexity value of the CLPC varies.

Figure 7:
FIG. 7 illustrates one embodiment of a third graph.

FIG. 7 illustrates one embodiment of a third graph. FIG. 7 illustrates a graph 700. Graph 700 may represent an alternative mapping between the threshold function Th(x) and the CLPC. Graph 700 may describe a technique for deriving Th(x) having a lower level of complexity relative to the technique described with reference with FIG. 6. Graph 700 may illustrate the case where a fixed threshold value Th(x) is predetermined and reflects a flat correlation between Th(x) and the CLPC. This may be computationally economic since a CLPC calculation may be obviated for some real-time applications.

Once Th(x) has been determined, the Th(x) value may be used to select the reference pixels for the target pixel x. For each reference pixel in the filter support, media processor 102-2 may determine a difference value between a target pixel value for the target pixel x and a candidate reference pixel value for a candidate reference pixel. Media processor 102 may compare the difference value with the threshold value Th(x). Media processor 102 may select the candidate reference pixel for the set of reference pixels if the difference value is smaller than the threshold value Th(x). Since the threshold value Th(x) is derived in view of the discrimination capabilities of the HVS, media processor 102-2 may select a more refined set of reference pixels for the target pixel x relative to conventional techniques, thereby providing improved image quality.

In some embodiments, media processor 102-2 may determine a complexity value for the CLPC in a number of different ways. In one embodiment, for example, media processor 102-2 may determine a complexity value for the CLPC based on a statistical variance of the local neighborhood of around the target pixel x. The local neighborhood may vary in size based on a given system budget. For example, the local neighborhood may have a pixel matrix size of 2×2, 3×3, 4×4, 5×5, or larger. If there are N pixels in the filter support S(x, k), the variance-based CLPC (VCLPC) may be denoted using Equation (3) as follows:

$$VCLPC(x)=1/N*\Sigma\{(S(x, k)-\text{mean}(S(x, k))\}^2 \quad (3)$$

where ^2 is the power of 2, and Σ collects the summation of every pixel in the filter support S(x, k). The mean of S(x, k) may be denoted using Equation (4) as follows:

$$\text{Mean}(S(x, k))=1/N*\Sigma S(x, k) \quad (4)$$

where Σ collects the summation of every pixel in the filter support S(x, k).

In one embodiment, media processor 102-2 may alternatively determine a complexity value for the CLPC using a lower complexity technique relative to VCLPC. For example, media processor 102-2 may use an absolute CLPC (ACLPC) technique to generate the complexity value. The ACLPC may be denoted using Equation (5) as follows:

$$ACLPC(x)=\Sigma ABS(S(x, k)-x) \quad (5)$$

where ABS(y) represents the absolute value of y, and Σ collects the summation of the absolute value of the difference for every pixel in the filter support S(x, k).

Depending on a given set of system constraints, the reference pixels of the filter support could be derived from a number of different domains. For example, the reference pixels may be selected from the spatial-only (CLPC_s) domain, the temporal-only (CLPC_t) domain, the spatial and temporal (CLPC_st) domain, the motion compensated only (CLPC_m) domain, the spatial and motion compensated (CLPC_sm) domain, the spatial, temporal, and motion compensated (CLPC_stm) domain, and so forth. The various different domain types for the reference pixels may be further combined with either the VCLPC or ACLPC techniques to provide a robust number of different algorithms suitable for a given set of system design constraints. The embodiments are not limited in this context.

In one embodiment, the values for CLPC_0 and CLPC_1 may be determined in real-time for some applications. Alternatively, the values for CLPC_0 and CLPC_1 may be determined off-line and may vary in accordance with a given technique used to determine the complexity value (e.g., VCLPC or ACLPC). In one embodiment, for example, the mapping between the Th(x) and the CLPC as shown in FIG. 6 can be the implemented using a look-up table (LUT) that is activated upon a request of a user. These mappings can be pre-loaded as the programmable option for various types of applications. Once the complexity value is determined, the Th(x) can be retrieved from the mapping of the LUT. Selection operations for the reference pixels may then be performed using the complexity value and retrieved Th(x).

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

In the description and claims, the terms coupled and connected, along with their derivatives, may be used. In particular embodiments, connected may be used to indicate that two or more elements are in direct physical or electrical contact with each other. Coupled may also mean that two or more elements are in direct physical or electrical contact. Coupled may also mean, however, that two or more elements may not be in direct contact with each other, but yet may still cooperate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Some embodiments may have been described in terms of algorithms and symbolic representations of operations on data bits or binary digital signals within a computer memory. It may be appreciated that these algorithmic descriptions and representations may be the techniques used by those skilled in the data processing arts to convey the substance of their work to others skilled in the art. An algorithm may be considered a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the above discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
   a media processor including an image signal processor having multiple processing elements to process a pixel matrix to determine a set of filter support pixels for a target pixel, select reference pixels from said filter support pixels using a correlation between a complexity value and a threshold value, said complexity value representing visual homogeneity of local picture content according to variations among said support pixels and differences between said support pixels and said target pixel, said threshold value derived from discrimination capability of a human vision system, and filter noise from said target pixel using said reference pixels.

2. The apparatus of claim 1, wherein said media processor comprises a multiple instruction streams, multiple data streams processor.

3. The apparatus of claim 1, wherein said image signal processor comprises:
an input processing engine;
an output processing engine;
a general purpose processing engine;
a first multiply and accumulate processing engine;
a second multiply and accumulate processing engine; and
a register file switch to couple to said processing engines.

4. The apparatus of claim 1, wherein said media processor is to determine said complexity value for a set of local pixels, and determine said threshold value based on said complexity value.

5. The apparatus of claim 4, wherein said media processor is to determine a difference value between a target pixel value for said target pixel and a candidate reference pixel value for a candidate reference pixel, compare said difference value with said threshold value, and select said candidate reference pixel for said set of reference pixels in accordance with said comparison.

6. A system, comprising:
a media source node to generate a stream of pixel values;
a media processing system to couple to said media source node, said media processing system to comprise:
a memory to store said pixel values; and
a media processor to couple to said memory, said media processor to include an image signal processor having multiple processing elements to process a pixel matrix to determine a set of filter support pixels for a target pixel, select reference pixels from said filter support pixels using a correlation between a complexity value and a threshold value, said complexity value representing visual homogeneity of local picture content according to variations among said support pixels and differences between said support pixels and said target pixel, said threshold value derived from discrimination capability of a human vision system, and filter noise from said target pixel using said reference pixels.

7. The system of claim 6, wherein said media processor comprises a multiple instruction streams, multiple data streams processor.

8. The system of claim 6, wherein said image signal processor comprises:
an input processing engine;
an output processing engine;
a general purpose processing engine;
a first multiply and accumulate processing engine;
a second multiply and accumulate processing engine; and
a register file switch to couple to said processing engines.

9. The system of claim 6, wherein said media processor is to determine said complexity value for a set of local pixels, and determine said threshold value based on said complexity value.

10. The system of claim 9, wherein said media processor is to determine a difference value between a target pixel value for said target pixel and a candidate reference pixel value for a candidate reference pixel, compare said difference value with said threshold value, and select said candidate reference pixel for said set of reference pixels in accordance with said comparison.

11. A computer-implemented method to filter an image, comprising:
determining a set of filter support pixels for a target pixel;
selecting reference pixels from said filter support pixels using a correlation between a complexity value and a threshold value, said complexity value representing visual homogeneity of local picture content according to variations among said support pixels and differences between said support pixels and said target pixel, said threshold value derived from discrimination capability of a human vision system; and
filtering noise from said target pixel using said reference pixels.

12. The method of claim 11, comprising:
determining said complexity value for a set of local pixels; and
determining said threshold value based on said complexity value.

13. The method of claim 12, comprising retrieving said threshold value from a table using said complexity value.

14. The method of claim 12, wherein said local pixels match said filter support pixels.

15. The method of claim 12, comprising:
determining a difference value between a target pixel value for said target pixel and a candidate reference pixel value for a candidate reference pixel;
comparing said difference value with said threshold value; and
selecting said candidate reference pixel for said set of reference pixels in accordance with said comparison.

16. An article comprising a machine-readable storage medium containing instructions that if executed enable a system to determine a set of filter support pixels for a target pixel, select reference pixels from said filter support pixels using a correlation between a complexity value and a threshold value, said complexity value representing visual homogeneity of local picture content according to variations among said support pixels and differences between said support pixels and said target pixel, said threshold value derived from discrimination capability of a human vision system, and filter noise from said target pixel using said reference pixels.

17. The article of claim 16, further comprising instructions that if executed enable the system to determine said complexity value for a set of local pixels, and determine said threshold value based on said complexity value.

18. The article of claim 17, further comprising instructions that if executed enable the system to retrieve said threshold value from a table using said complexity value.

19. The article of claim 17, wherein said local pixels match said filter support pixels.

20. The article of claim 17, further comprising instructions that if executed enable the system to determine a difference value between a target pixel value for said target pixel and a candidate reference pixel value for a candidate reference pixel, compare said difference value with said threshold value, and select said candidate reference pixel for said set of reference pixels in accordance with said comparison.

* * * * *